United States Patent
Fujimoto

(10) Patent No.: US 7,962,492 B2
(45) Date of Patent: Jun. 14, 2011

(54) DATA MANAGEMENT APPARATUS, DATA MANAGEMENT METHOD, DATA PROCESSING METHOD, AND PROGRAM

(75) Inventor: Yukio Fujimoto, Tama (JP)

(73) Assignee: Sophia Co., Ltd., Tokyo (JP)

( * ) Notice: Subject to any disclaimer, the term of this patent is extended or adjusted under 35 U.S.C. 154(b) by 423 days.

(21) Appl. No.: 11/667,388

(22) PCT Filed: Jul. 21, 2006

(86) PCT No.: PCT/JP2006/014520
§ 371 (c)(1),
(2), (4) Date: May 9, 2007

(87) PCT Pub. No.: WO2007/011036
PCT Pub. Date: Jan. 25, 2007

(65) Prior Publication Data
US 2008/0046748 A1     Feb. 21, 2008

(30) Foreign Application Priority Data

Jul. 22, 2005   (JP) .................................. 2005-213302
Jun. 5, 2006   (JP) .................................. 2006-156632

(51) Int. Cl.
*G06F 7/00* (2006.01)
(52) U.S. Cl. ........ 707/754; 707/755; 707/756; 707/757; 707/941
(58) Field of Classification Search .................. 707/100, 707/754–757
See application file for complete search history.

(56) References Cited

U.S. PATENT DOCUMENTS

| 6,732,113 | B1* | 5/2004 | Ober et al. ............................ 1/1 |
| 2002/0042859 | A1* | 4/2002 | Lowry .......................... 711/100 |
| 2003/0014394 | A1* | 1/2003 | Fujiwara et al. .................. 707/3 |
| 2004/0111622 | A1* | 6/2004 | Schoenberg .................. 713/182 |
| 2006/0026039 | A1* | 2/2006 | Shoenhair et al. ................ 705/3 |

FOREIGN PATENT DOCUMENTS

| JP | 2003-271782 | 9/2003 |
| JP | 2004-178517 | 6/2004 |
| WO | 02/06948 A1 | 1/2002 |

* cited by examiner

*Primary Examiner* — Tim T. Vo
*Assistant Examiner* — Gary Koo
(74) *Attorney, Agent, or Firm* — The Nath Law Group; Jerald L. Meyer; Stanley N. Protigal

(57) ABSTRACT

Data management security against leakage or loss of personal information is achieved by setting a division range for dividing personal information into identification information that enables a specific individual to be identified and attribute information that does not by itself enable a specific individual to be identified. A CPU performs first division of personal information into identification information and attribute information in accordance with the division range specified by the user, performs second division of identification information that has undergone first division into a plurality of fragments for which data processing is possible, and furthermore generates linkage key information for restoring the divided identification information, attribute information, and plurality of fragments to the original personal information, and executes data storage processing that stores the identification information, attribute information, and plurality of fragments in an external storage apparatus and linkage key information in a nonvolatile auxiliary storage apparatus.

7 Claims, 8 Drawing Sheets

ORIGINAL DATA TO BE DIVIDED

| NAME | AGE | WEIGHT | HEIGHT | BLOOD GLUCOSE LEVEL | |
|---|---|---|---|---|---|
| TARO YAMADA | 55 | 74 | 175 | 98 | FIRST LINE |
| HANAKO SUZUKI | 45 | 48 | 160 | 120 | SECOND LINE |
| ... | ... | ... | ... | ... | |
| HAJIME SATO | 34 | 58 | 175 | 136 | NTH LINE |

| 5391 |
|------|
| 7308 |
| 6683 |
| ⋮ |
| 7138 |
| 3410 |

(n × 2) ITEMS

FIG.6B

| 5391 | 4628 |
|------|------|
| 7308 | 9462 |
| 6683 | 9321 |
| ⋮ | ⋮ |
| 7749 | 7138 |
| 9284 | 3410 |

FIG.6C

| TARO YAMADA | 5391 | 4628 | 55 | 74 | 175 | 98 |
|---|---|---|---|---|---|---|
| HANAKO SUZUKI | 7308 | 9462 | 45 | 48 | 160 | 120 |
| | | | | | | |
| ⋮ | ⋮ | ⋮ | | | ⋮ | |
| | | | | | | |
| HAJIME SATO | 9284 | 3410 | 34 | 58 | 175 | 136 |

FIG.6D

| TARO YAMADA | 5391 |
|---|---|
| HANAKO SUZUKI | 7308 |
| | |
| ⋮ | |
| | |
| HAJIME SATO | 9284 |

| 4628 | 55 | 74 | 175 | 98 |
|---|---|---|---|---|
| 9462 | 45 | 48 | 160 | 120 |
| | | | | |
| ⋮ | | | | |
| | | | | |
| 3410 | 34 | 58 | 175 | 136 |

DATA MANAGEMENT APPARATUS, DATA MANAGEMENT METHOD, DATA PROCESSING METHOD, AND PROGRAM

TECHNICAL FIELD

The present invention relates to a data management apparatus, data management method, data processing method, and program.

BACKGROUND ART

With the increasing use of networks as typified by the Internet in recent years, the transmission and reception of e-mail and files has become widespread. In line with this trend, concerns have grown concerning security.

When electronic information is exchanged via a network, there is a possibility of contents being tampered with, rewritten, or switched, and such actions may leave no traces and be difficult to detect after the event. Moreover, it is comparatively easy to tap into a communication path and make use of a communication in progress. Hitherto, a method of achieving security by sending electronic information in encrypted form has been used in such cases. However, with an encryption method, all electronic information to be sent is included in the communication data, and therefore in the event of a communication leak, it is still possible for a highly skilled hacker to decrypt and tamper with electronic information.

Furthermore, the introduction of personal information protection legislation has involved organizations and institutions that handle personal information in enormous effort and expense in order to manage such information, since a heavy social responsibility is inevitably incurred in the event of an accident arising out of the handling of personal information. However, no matter how stringently management is implemented, mishaps related to personal information continue to occur.

Technologies for protecting personal information can be broadly classified as follows.

(1) User authentication: A system whereby a user accessing information is confirmed to be an authorized user at the entry point. A typical example is authentication by means of an ID or password. Biometric authentication techniques using physical characteristics such as fingerprints, vein patterns, and iris patterns, are also included in this category. This kind of technology prevents unauthorized access at the information entry point, but does not protect personal information itself once unauthorized access has been achieved. While falsification of biometric authentication data is difficult, drawbacks include high cost.

(2) Information encryption: A system that prevents persons other than the encryption key holder from learning information contents. Even when personal information is encrypted, it comprises an integral entity as information, and a possibility of information leakage remains through loss or theft.

(3) Thin client: In order to prevent leakage of information including personal information, a hard disk (HD) is not installed in a terminal personal computer from the outset, and data or software needed for work is accessed via a LAN.

(4) Information distribution: An item of information is divided into a plurality of distributed information items and managed in that form. The entirety of the information cannot be seen simply by viewing the individual distributed information items. An example of this technique is the information management system described in Patent Document 1, which attempts to achieve confidentiality and security of personal information by fragmenting personal information by means of division and storing the information in a plurality of data storage terminals in a network.

The personal information distributed management method and system described in Patent Document 2 presents a method whereby personal information and notification destination information located in distributed fashion in a plurality of terminals in a network is transferred among the terminals.

Patent Document 1: Unexamined Japanese Patent Publication No. 2003-271782

Patent Document 2: Unexamined Japanese Patent Publication No. 2004-178517

DISCLOSURE OF INVENTION

Problems to be Solved by the Invention

However, the following kinds of problems remain to be solved in such conventional personal information management apparatuses.

Information protection by means of user authentication or encryption still leaves the possibility of access by an unauthorized third party. Since information contents exist as personal information to the very end, if illegal access is once permitted, leakage of the entire information is inevitable. Therefore, the administrator is held responsible in the event of mishaps such as loss or theft.

Also, with a thin client, information is downloaded item by item for use. As this terminal is not a personal computer with an integral storage medium, it is inconvenient for processing a large amount of information. Furthermore, risks are involved when personal information moves over a network in unmodified form. "Information distribution" in the personal information management system described in Patent Document 1 is not division based on the meaning and contents of information. Therefore, (a) fragments of mechanically divided information fundamentally entail the possibility of a part of personal information going astray, and (b) since fragments of information include linkage information, there remains a possibility of the original information being restored from the fragments themselves.

The present invention has been implemented taking into account the problems described above, and it is an object of the present invention to provide a data management apparatus, data management method, data processing method, and program that enable a high degree of security against leakage or loss of personal information to be achieved.

It is a further object of the present invention to provide a data management apparatus, data management method, data processing method, and program that enable data processing efficiency to be attained while achieving a high degree of security.

Means for Solving the Problems

A data management apparatus of the present invention employs a configuration that includes: a personal information database that stores personal information in which identification information that enables a specific individual to be identified, and attribute information that is information that relates to the specific individual and does not by itself enable a specific individual to be identified, is arranged on a line-by-line basis; a display section that displays a division range constituting a boundary at which the identification function of the personal information is eliminated and made meaningless; a receiving section that receives input of the division range for the displayed personal information; a division section that divides the personal information into a plurality of fragmentary information items that have no identification function by themselves in accordance with the received division range; a linkage key information generation section that performs association of each divided fragmentary information item using a unique code assigned to each such fragmentary information item, and generates linkage key information indicating that association; a storage section that stores divided fragmentary information items in a data processing file; a key information storage section that stores the generated linkage key information in a storage medium different from the data processing file; and a personal information restoration section that restores original personal information from divided fragmentary information items based on the association of the stored linkage key information.

A data management apparatus of the present invention employs a configuration that includes: a personal information database that stores personal information in which identification information that enables a specific individual to be identified, and attribute information that is information that relates to the specific individual and does not by itself enable a specific individual to be identified, is arranged on a line-by-line basis; a display section that displays in specifiable fashion a division range that divides the personal information into a column of the identification information and a column of the attribute information; a receiving section that receives input of the division range for the displayed personal information; a first division section that divides the personal information into the identification information and the attribute information in accordance with the received division range; a first key information generation section that associates the divided identification information with the attribute information of the same line as this identification information using a first unique code assigned respectively to the identification information and the attribute information, and generates first linkage key information indicating that association; a second division section that divides the identification information divided by the first division section into a plurality of fragmentary information items; a second key information generation section that performs association of the plurality of fragmentary information items of the same line using a second unique code assigned to each of the plurality of fragmentary information items, and generates second linkage key information indicating that association; a storage section that stores the divided attribute information and the plurality of fragmentary information items in a data processing file; a key information storage section that stores the generated first and second linkage key information in a storage medium different from the data processing file; and a personal information restoration section that restores original personal information from the divided plurality of fragmentary information items and the attribute information based on the association of the stored first and second linkage key information.

A data management method of the present invention is a data management method of a data management apparatus that accesses data stored in a database that stores personal information and performs data processing by execution of a program stored in memory, wherein the data management method includes: a step of displaying in specifiable fashion a division range that divides personal information in which identification information that enables a specific individual to be identified, and attribute information that is information that relates to the specific individual and does not by itself enable a specific individual to be identified, is arranged on a line-by-line basis, into a column of the identification information and a column of the attribute information; a step of receiving input of the division range for the displayed personal information; a first division step of dividing the personal information into the identification information and the attribute information in accordance with the received division range; a step of associating the divided identification information with the attribute information of the same line as this identification information using a first unique code assigned respectively to the identification information and the attribute information, and generating first linkage key information indicating that association; a second division step of dividing the identification information that has undergone first division into a plurality of fragmentary information items; a step of performing association of the plurality of fragmentary information items of the same line using a second unique code assigned to each of the plurality of fragmentary information items, and generating second linkage key information indicating that association; a step of storing the divided attribute information and the plurality of fragmentary information items in a data processing file; a step of storing the generated first and second linkage key information in a storage medium different from the data processing file; and a step of restoring original personal information from the divided plurality of fragmentary information items and the attribute information based on the association of the stored first and second linkage key information.

A data processing method of the present invention is a data processing method invoked during execution of an application program that accesses data stored in a database and executes data processing, wherein the data processing method includes: a step of displaying in specifiable fashion a division range that divides personal information in which identification information that enables a specific individual to be identified, and attribute information that is information that relates to the specific individual and does not by itself enable a specific individual to be identified, is arranged on a line-by-line basis, into a column of the identification information and a column of the attribute information; a step of receiving input of the division range for the displayed personal information; a first division step of dividing the personal information into the identification information and the attribute information in accordance with the received division range; a step of associating the divided identification information with the attribute information of the same line as this identification information using a first unique code assigned respectively to the identification information and the attribute information, and generating first linkage key information indicating that association; a second division step of dividing the identification information that has undergone first division into a plurality of fragmentary information items; a step of performing association of the plurality of fragmentary information items of the same line using a second unique code assigned to each of the plurality of fragmentary information items, and generating second linkage key information indicating that association; a step of storing the divided attribute information and the plurality of fragmentary information items in a data processing file; a step of storing the generated first and second linkage key information in a storage medium different from the data processing file; a step of restoring original personal information from the divided plurality of fragmentary information items and the attribute information based on the association of the stored first and second linkage key information; and a step of executing data processing on the divided attribute information.

From another viewpoint, the present invention is a program for causing a computer to execute the above steps.

Advantageous Effect of the Invention

The present invention enables a high degree of security against leakage or loss of personal information to be achieved. Moreover, the present invention is suitable for application to package software such as spreadsheet software or the like as a data storage program. Furthermore, since the present invention does not require special members and does not entail an increase in the number of components, it is low-cost and easy to implement, and can be widely applied to information processing apparatuses such as personal computers.

BRIEF DESCRIPTION OF DRAWINGS

FIG. 4 is a drawing showing an example of personal information stored in a personal information database of a data management apparatus according to above-mentioned Embodiment 1;

FIG. 6 is a drawing showing an example of information division processing and linkage key information generation of a data management apparatus according to above-mentioned Embodiment 1;

BEST MODE FOR CARRYING OUT THE INVENTION

Embodiments of the present invention will now be described in detail with reference to the accompanying drawings.
(Basic Concept of the Present Invention)

The present invention provides a data management apparatus, data management method, data processing method, and data storage method for a database whose main object is the protection of personal information.

First, a definition of personal information will be given, and types of personal information will be described.

According to Section 1, Clause 2 of the law relating to protection of personal information, "personal information" is information relating to a living person that enables a specific individual to be identified by means of a name, date of birth, or other details included in that information (including information that can easily be checked against other information, thereby enabling a specific individual to be identified). Personal information referred to below complies with the above definition.

The present inventors found that the above personal information can be divided into identification information that enables a specific individual to be identified, and attribute information that becomes personal information when linked to the aforementioned identification information but does not constitute personal information by itself.

Specifically, identification information is a name, and includes a middle name when a person's name is composed of three elements. Specific examples of attribute information include address, telephone number, date of birth, age, sex, height, weight, blood type, annual income, education, family makeup, interests, likes, magazines purchased, and so forth. Information based on identification information is information that does not enable a specific individual to be identified by itself but enables an individual to be identified easily through checking against information linked to a specific individual. Specific examples of such information are a customer number, membership number, and ID number.

Figure 1:
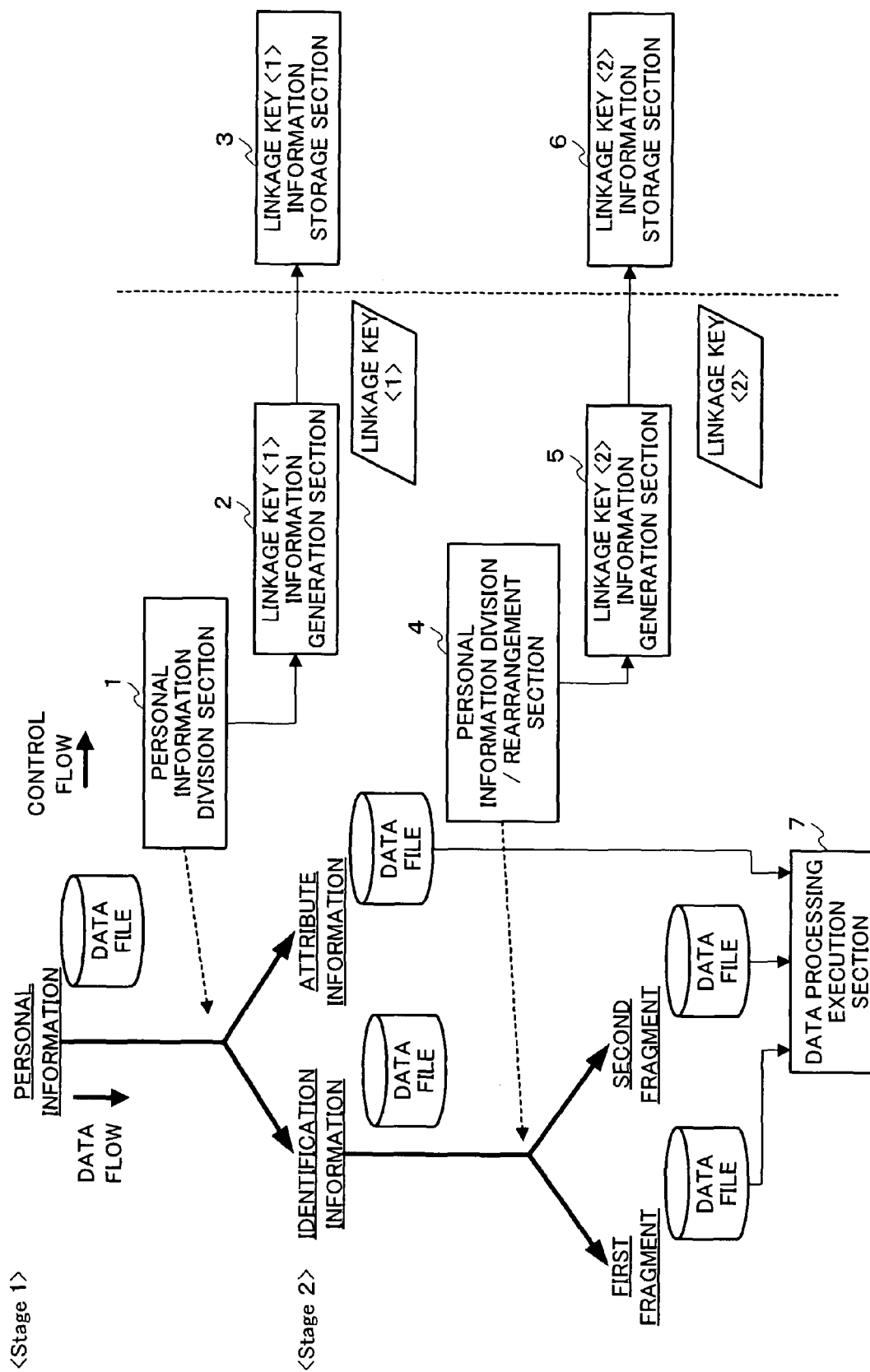
FIG. 1 is a drawing explaining the basic concept of the present invention.

FIG. 1 is a drawing explaining the basic concept of the present invention.
<Stage 1>

By means of a personal information division section 1, personal information is divided artificially into identification information and attribute information. In this division, artificial division is performed so that personal information loses the function of being able to identify a specific individual—that is, has its significance as personal information eliminated. Above-described personal information, identification information, and attribute information are stored in data files comprising predetermined storage media.

Then, by means of a linkage key <1> information generation section 2, linkage key <1> information for restoring divided identification information and attribute information to the original personal information is generated, and the generated linkage key <1> information is stored as a linkage key <1> file in a predetermined storage medium different from the aforementioned data files by means of a linkage key <1> information storage section 3.
<Stage 2>

By means of a personal information division/rearrangement section 4, identification information resulting from division of the above-described personal information is further divided into a plurality of fragments, and the divided fragments are randomly rearranged and stored in data files comprising predetermined storage media. When identification information is a name, the fragments may be, for example, the family name (first fragment) and given name (second fragment). When identification information is an ID based on a name, fragments may be separately created based on a hyphen, a number of characters, or the like, for example.

Then, by means of a linkage key <2> information generation section 5, linkage key <2> information for restoring divided fragments to the original identification information is generated, and the generated linkage key <2> information is stored as a linkage key <2> file in a predetermined storage medium different from the aforementioned data files by means of a linkage key <2> information storage section 6.

Furthermore, a data processing execution section 7 executes data processing on a plurality of fragments and/or attribute information divided by personal information division/rearrangement section 4.

Thus, the present invention does not simply divide/store files mechanically, but divides personal information into identification information and attribute information, and by further dividing that identification information into a first fragment (for example, family name) and a second fragment (for example, given name), changes the respective fragments into items that have no meaning as personal information. That is to say, by re-dividing the identification information, an identification function is almost totally eliminated from the re-divided identification information. Also, linkage key information is stored on a different medium from fragments and attribute information. Therefore, data that has ceased to be personal information is stored in data files. Since data stored in the data files is no more than a collection of data that cannot identify an individual, personal information can be protected. Meanwhile, attribute information resulting from division of personal information has no individual identification function, and can therefore be used by itself for various kinds of data processing. Also, since the original personal information cannot be restored unless linkage key information can be acquired, effective personal information protection can be achieved.

EMBODIMENT 1

Figure 2:
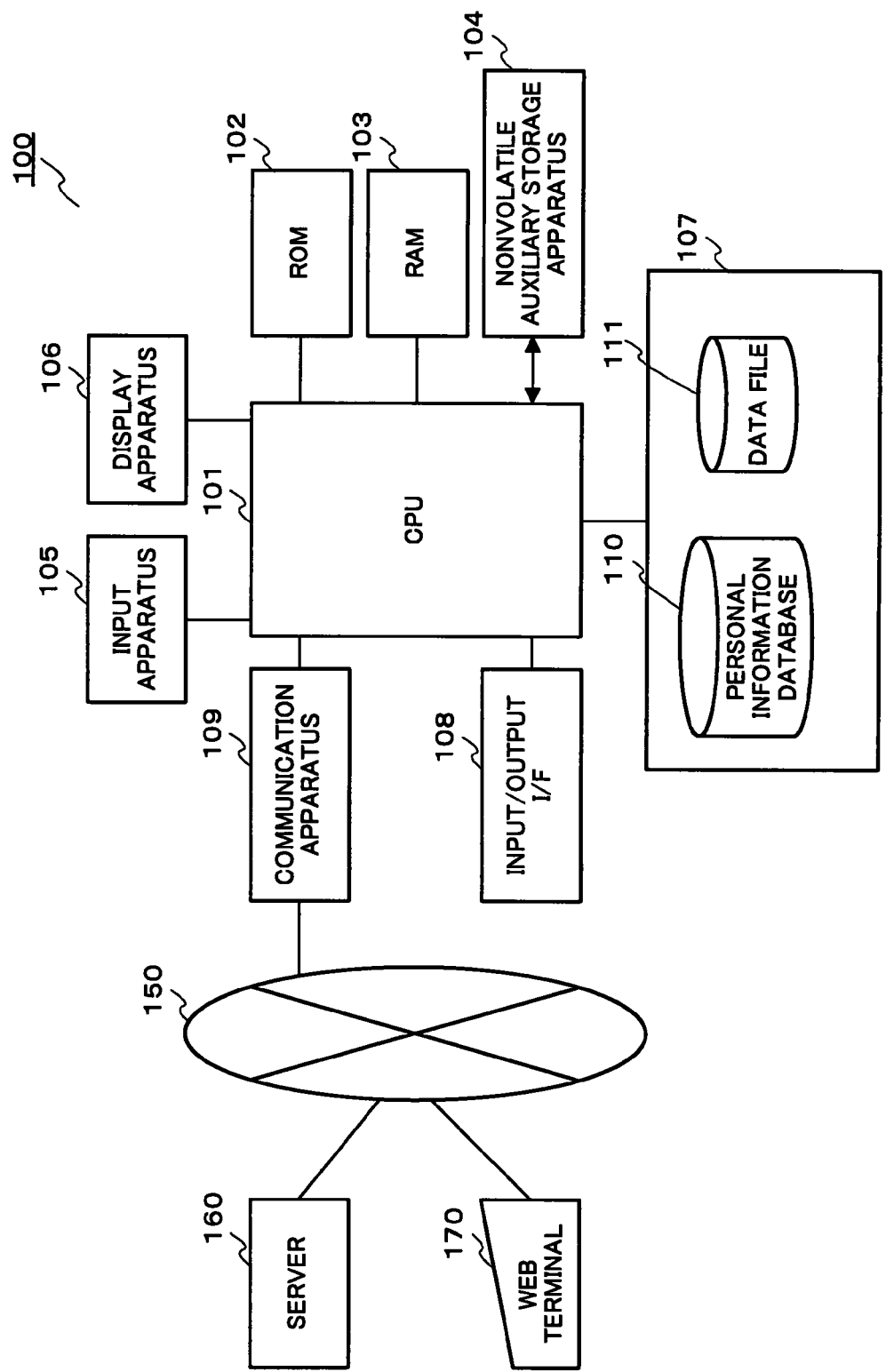
FIG. 2 is a drawing showing the configuration of a data management apparatus according to Embodiment 1 of the present invention.

FIG. 2 is a drawing showing the configuration of a data management apparatus according to Embodiment 1 of the present invention based on the above-described basic concept. This embodiment is an example of application as a data management apparatus to an information processing apparatus (data processing apparatus) such as a personal computer.

In FIG. 2, a data management apparatus 100 is configured by means of a CPU 101 (part of a specification section, a first division section, a second division section, a linkage key generation section, and a rearrangement section), ROM 102 that stores a control program, fixed data, and so forth, RAM 103 that is the CPU 101 execution and working storage area, EEPROM (electrically erasable programmable ROM) that is electrically rewritable nonvolatile memory, a nonvolatile auxiliary storage apparatus 104 (second storage medium, storage section) comprising RAM or the like with power supply backup, an input apparatus 105 (specification section) comprising a keyboard and a pointing device such as a mouse, a display apparatus 106 comprising an LCD display or the like, an external storage apparatus 107 (first storage medium, storage section) comprising a hard disk drive (HDD), DVD, or the like, an input/output interface (I/F) 108, and a communication apparatus 109.

Communication apparatus 109 comprises a modem port and so forth, and is connected to various kinds of servers 160 and web terminals 170 via an Internet network 150 comprising the Internet or dedicated lines.

Server 160 is a commercial server that stores various kinds of data such as information provision data as a database.

CPU 101 performs overall control of data management apparatus 100, and also receives a user specification of a division range for dividing personal information into identification information that enables a specific individual to be identified and attribute information that does not by itself enable a specific individual to be identified, performs first division of personal information into identification information and attribute information in accordance with the division range specified by the user, performs second division of identification information that has undergone first division into a plurality of fragments for which data processing is possible, and furthermore generates linkage key information for restoring the divided identification information, attribute information, and plurality of fragments to the original personal information, and executes data storage processing that stores identification information and attribute information in external storage apparatus 107 and linkage key information in nonvolatile auxiliary storage apparatus 104.

In this embodiment, data management apparatus 100 is applied to a data processing apparatus such as a personal computer, and CPU 101 has a function as a data processing execution section that accesses data stored in a database and performs data processing such as spreadsheet processing by means of application program execution. In this case, CPU 101 executes data processing such as spreadsheet processing or statistical processing on a divided plurality of fragments or attribute information.

Nonvolatile auxiliary storage apparatus 104 stores working data, auxiliary programs, and so forth that must be retained after power is turned off until power is next turned on, as well as generated linkage key information files. This nonvolatile auxiliary storage apparatus 104 may be USB (Universal Serial Bus) memory or a card-type external extension storage medium that can be removed from the main unit. Such storage media include, for example, a disk apparatus such as a small hard disk drive (HDD), an SRAM (Static RAM) card that retains written information by means of power supply backup, or CompactFlash(registered trademark) (CF), SD Memory(registerd trademark), SmartMedia(registered trademark) , a Memory Stick, and so forth comprising flash memory or the like that does not require power supply backup.

Input apparatus 105 comprises a keyboard and a pointing device such as a mouse, and specifies personal information input and a division range for dividing personal information into identification information and attribute information.

External storage apparatus 107 is provided with a personal information database 110 that stores personal information and a data file 111 that stores various kinds of information and divided fragments. Personal information database 110 can only be accessed by an authorized administrator.

Input/output I/F 108 performs communication with an external peripheral by means of IrDA (Infrared Data Association) infrared data communication or cable communication using a USB or the like.

Communication apparatus 109 performs communication with a server 160 or other web terminal 170 connected to Internet network 150.

Internet network 150 is a network comprising a mobile communication network, a public switched telephone network, a LAN, the Internet, or the like. The type of network, such as cable or radio, and the type of protocol do not particularly matter. Also, it is possible to use a large-capacity channel such as FTTH (Fiber To The Home), HFC (Hybrid Fiber Coax (optical coaxial cable)), or ADSL (Asymmetrical Digital Subscriber Line)/VDSL (Very high data rate Digital Subscriber Line) as a network access channel. In a radio system, it is possible to use a carrier connected to a carrier server via a carrier network that is a dedicated line, as well as Bluetooth, UWB (Ultra Wideband), or a radio LAN that performs radio communication by transmitting and receiving non-carrier radio waves.

The operation of a data management apparatus configured as described above will now be explained.

Figure 3:
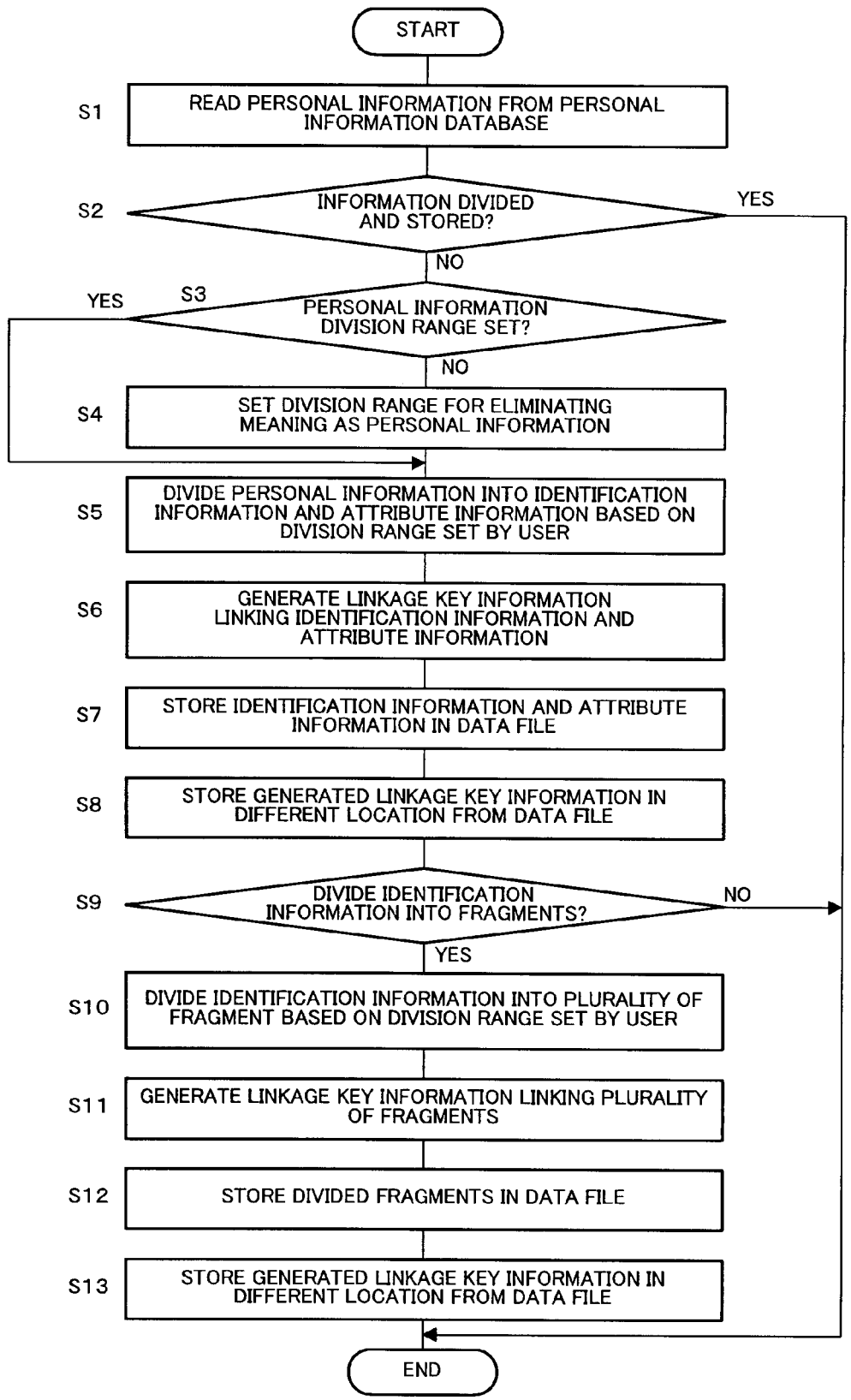
FIG. 3 is a flowchart showing the data storage method of a data management apparatus according to above-mentioned Embodiment 1.

FIG. 3 is a flowchart showing the data storage method of the data management apparatus, this flow being executed by CPU 101. For example, this processing may be called and executed as a data storage program when application software is executed. In the figure, "S" denotes a step of the flow.

First, in step S1, personal information is read from personal information database (DB) 110. FIG. 4 is a drawing showing an example of personal information stored in the personal information database. Here, personal information subject to protection comprises an individual's age, weight, height, and blood glucose level data.

In step S2, it is determined whether or not information has already been divided and stored by means of this data storage method. If information has already been divided and stored, this flow is terminated without further action. If information has not been divided and stored, in step S3 it is determined whether or not a division range (division location) for first division of personal information into identification information and attribute information has been set. If a personal information division range has not been set, in step S4 the user sets a division range constituting a boundary at which meaning as personal information is eliminated. This setting is specified by the user by means of input apparatus 105 at a suitable location while checking personal information read from the personal information database by means of display apparatus 106. In this case, it is desirable to employ a mode whereby guidance is displayed indicating that it is desirable to use a name as identification information, and other details as attribute information, a division recommendation mark is displayed between identification information and attribute information, or a division range is displayed after a name by default, and the system waits only for the user's confirmatory command. The above-described first division processing that divides personal information into identification information and attribute information is division processing as a preliminary task (preprocessing task) for clearly distinguishing identification information from personal information beforehand in order to perform division of identification information again in subsequent processing.

Next, in step S5, personal information is divided into identification information and attribute information based on the division range set by the user, and in step S6 linkage key information that links the divided identification information and attribute information is generated. Details of the division procedure and linkage key information generation will be given later herein using FIG. 5 and FIG. 6.

Then, in step S7, the divided identification information and attribute information are stored in a data file, and in step S8 the generated linkage key information is stored as a linkage key <1> file in a predetermined storage medium different from the data file.

In step S9 it is determined whether or not the identification information is to be divided into a plurality of fragments. For this setting, also, the user gives a command by means of input apparatus 105 in accordance with guidance (for example, "Fragment?") displayed by display apparatus 106. In this case, a mode may be employed whereby identification information is divided into fragments by default. Division may be performed, for example, based on a space between a family name and given name, a hyphen, a number of characters, and so forth. It is also possible to search a name database and obtain the location of division between a family name and given name. If identification information is not to be divided into fragments, this flow is terminated.

If identification information is to be divided into fragments, in step S10 second division of the identification information into a plurality of fragments is performed based on the division range set by the user, and in step S11 linkage key information linking the divided plurality of fragments is generated. With regard to details of the division procedure and linkage key information generation, implementation is possible in the same way as for the above-described personal information division and linkage key information generation.

Next, in step S12, the divided plurality of fragments are stored in a data file, and in step S13 the generated linkage key information is stored as a linkage key <2> file in a predetermined storage medium different from the data file, and this flow is terminated.

By means of the above-described second division processing, in view of the particularities of personal information, after personal information has been divided into identification information and attribute information by means of first division processing, that identification information can be re-divided into a plurality of fragments whose identification function has been almost totally eliminated. By this means, it is possible to obtain fragments that have lost their meaning as personal information, and attribute information that likewise does not have identification information.

Figure 5:
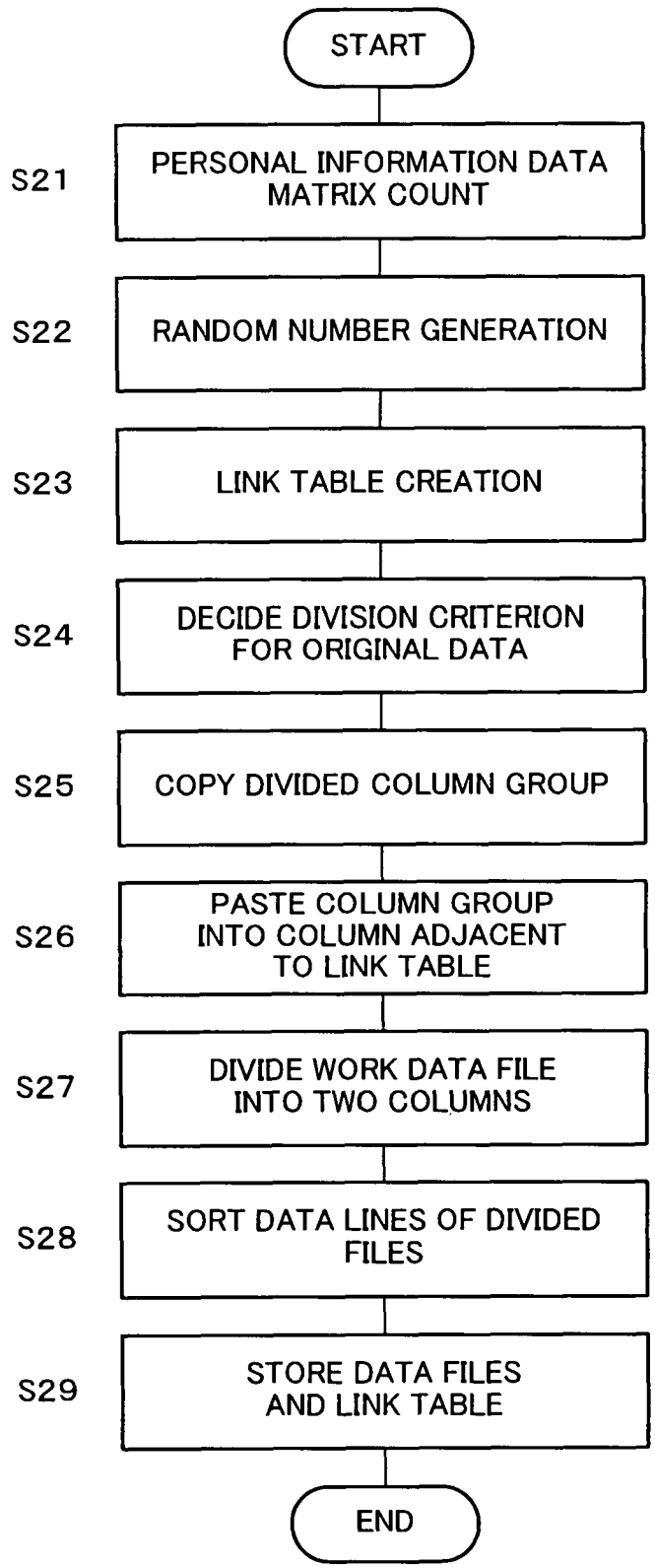
FIG. 5 is a flowchart showing details of information division and linkage key information generation of a data management apparatus according to above-mentioned Embodiment 1.

FIG. 5 is a flowchart showing details of information division and linkage key information generation, comprising the detailed steps of step S6 and step S11 in FIG. 3. FIG. 6 is a drawing showing an example of information division processing and linkage key information generation performed by the flow in FIG. 5.

First, in step S21, a data matrix count is performed for personal information to be divided. For instance, taking the personal information shown in FIG. 4 as an example, the number of lines of this table data is counted. In FIG. 4, the number of lines is counted in data columns comprising a name (identification information) and attribute information (other items such as age and so forth). The number of lines of data from the first line (Taro Yamada) to the nth line (Hajime Sato) is n. Next, in step S22, a random number is generated and a table of (n×2) random numbers (see FIG. 6A) is created, and in step S23 a link table (see FIG. 6B) is created from the generated random number table. Random number table creation conditions are, for example, that no number begins with 0 (condition 1) and the same number is not duplicated (condition 2). As shown in FIG. 6A, a link table is created that comprises a pair of columns: a sequence from 1 to n shown in FIG. 6A, and a sequence from n+1 to n×2. The link table composed of this pair of columns is linkage key information.

In step S24, the division criterion for the original data is decided. When this flow is called in step S6 in FIG. 3, a setting is read that divides personal information into personal information and identification information. When this flow is called in step S11 in FIG. 3, a setting is read that divides identification information into fragments. Then, in step S25, personal information is divided into personal information and identification information in accordance with the division range (division location) set by the user. Specifically, a column group comprising a column group composed of personal information, and identification information, is copied to a new work data file. Next, in step S26, the column group copied in step S25 above is pasted into a column adjacent to the link table created in step S23 above. As shown in FIG. 6C, the link table (see FIG. 6B) is pasted between the column group composed of personal information and the column group composed of identification information.

Next, in step S27, the work data file in which the link table was pasted is divided into two (see FIG. 6D), and in step S28 the data lines of the divided files are sorted using random numbers. By this means, the forward and rearward relativity of data items in the file is lost, and personal information is much better protected. Then, in step S29, the respective files are stored on an HDD or the like as separate data files, the link table is stored as linkage key information in a different storage medium from the data files (for example, removable SD Memory or a removable SD Card), and this flow is terminated.

In the above description, a case in which personal information is divided into personal information and identification information in accordance with a set division range has been taken as an example, but the situation is similar for a case in which identification information is divided into a plurality of fragments. In this case, the same kind of processing can be performed with, for example, a space between family name and given name, a hyphen, a number of characters, or suchlike division specification used for the division criterion in step S14.

In specific terms, the following operations are implemented by executing the above-described flows.

Figure 7:
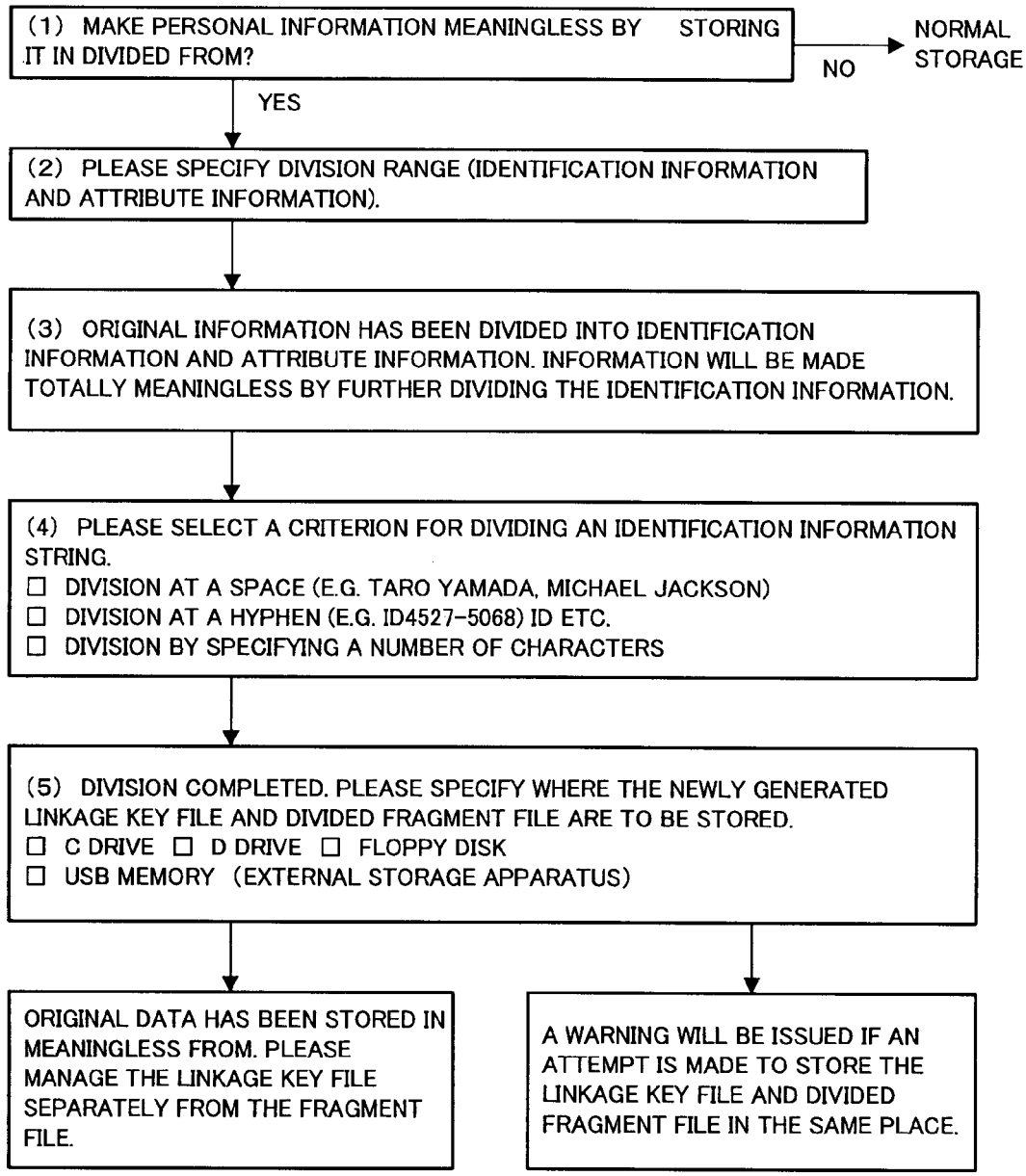
FIG. 7 is a flowchart showing the procedure at the time of data storage of a data management apparatus according to above-mentioned Embodiment 1.

FIG. 7 is a flowchart showing the procedure at the time of data storage, and shows an example of the procedure in the case of incorporation in package software. An example will be considered in which the package software is spreadsheet software.

Data storage is executed in the spreadsheet software.

(1) "Make personal information meaningless by storing it in divided form?" is displayed by means of a dialog display or the like by the software. If divided storage of personal information is not specified by a user command, normal storage is performed.

(2) If divided storage of personal information is specified by a user command, "Please specify division range (identification information and attribute information)" is displayed, and the software waits for a user command.

(3) When the boundary between two blocks is specified by the user, the following is displayed: "Original information has been divided into identification information and attribute information. Information will be made totally meaningless by further dividing the identification information."

(4) The following is displayed: "Please select a criterion for dividing an identification information string. Division at a space (e.g. Taro Yamada, Michael Jackson)/division at a hyphen (e.g. ID4527-5068)/division by specifying a number of characters." When a name includes a middle name, as in the case of John Fitzgerald Kennedy, for example, identification information string division at a space, dot, or hyphen can also be performed for "Fitzgerald" (often abbreviated to "F.").

(5) The following is displayed and the software waits for a user command: "Division completed. Please specify where the newly generated linkage key file and divided fragment file are to be stored. C drive/D drive/floppy (registered trademark) disk/USB memory (external storage apparatus).

(6) Data is stored in the locations specified by the user command, and the following is displayed: "Original data has been stored in meaningless form. Please manage the linkage key file separately from the fragment file." In this example, a warning (message display/warning tone) is issued if an attempt is made to store the linkage key file and divided fragment file in the same place.

Envisaged actual examples of use are described below.

1. The meaning of any divided fragmentary information as personal information is eliminated. From the viewpoint of the original data, this fragmentary information and attribute information (or fragments thereof) are complete data by themselves while being information fragments. It is therefore possible to configure a database or perform data processing by means of spreadsheet or suchlike application software while maintaining security. For example, it is possible to create fragments of attribute information associated with identification information such as names from the statistical results of an opinion poll, and store these in a notebook personal computer and take them home, and create a graph by executing statistical processing of numeric values. As in this example, a method of use can be envisaged in which database processing is performed that does not involve any risk of leakage of personal information, and fragments are re-linked as necessary. This method of use is not available with conventional mechanical division.

2. In the case of individual users
  a. Fragment files of personal information made meaningless are stored on the hard disk of a notebook personal computer.
  b. A linkage key information file is stored in an external storage apparatus such as USB memory and carried separately from the notebook personal computer.
  c. In the field, the USB memory or such like external storage apparatus in which the linkage key information file is stored is inserted into the notebook personal computer and used for work. After the work is finished, the USB memory or suchlike external storage apparatus is removed and managed.

3. In the case of large-scale users
  a. Fragment files and a linkage key information file of personal information made meaningless are stored separately on a company's internal network.
  b. A company employee downloads fragment files and a linkage key information file of personal information made meaningless from the network for use.

4. An information administrator should intervene in the event of loss, theft, or disposal of a hard disk.

Only fragments of personal information made meaningless are contained on a hard disk. These fragments have no meaning as information if viewed by a third party. There is consequently no possibility of information being leaked from a hard disk. This property is extremely effective vis-à-vis the stipulations of a "Personal Information Protection Bill" in the event of loss, theft, or disposal of a hard disk. Also, in the event of theft or loss, leakage of personal information can be effectively prevented by speedily freezing a linkage key information file corresponding to that information. The same is true when information fragments are stored on a storage medium such as a CD or DVD.

As described above, data management apparatus 100 of this embodiment sets a division range for dividing personal information into identification information that enables a specific person to be identified and attribute information that does not by itself enable a specific individual to be identified, and CPU 101 performs first division of personal information into identification information and attribute information in accordance with a user-specified division range and performs second division of identification information that has undergone first division into a plurality of fragments for which data processing is possible, and furthermore generates linkage key information for restoring the divided identification information, attribute information, and plurality of fragments to the original personal information, and executes data storage processing that stores the identification information, attribute information, and plurality of fragments in external storage apparatus 107, and linkage key information in nonvolatile auxiliary storage apparatus 104, thus enabling a high degree of security against leakage or loss of personal information to be achieved. That is to say, information division is not performed mechanically, but is performed with the purpose of eliminating meaning as personal information based on the characteristics of personal information, and preventing the unauthorized use of information by a third party. Personal information is divided into identification information (generally being a name) and attribute information in a first stage. Then, a name constituting identification information is divided into two separate files, "family name" and "given name." Information linking divided fragments is not written within fragments, but is stored as third linkage key information in a newly generated file. The effective functioning of this linkage key information generation in unified management of information is as illustrated in the above-described examples of use.

In particular, a special characteristic of this embodiment is that, by not simply dividing/storing files mechanically, but performing division into identification information and attribute information, and further dividing that identification information into "family name" and "given name," individual fragments are changed into items that have no meaning as personal information.

As all divided fragmentary information loses meaning as personal information, configuration of a database or data processing by means of spreadsheet or suchlike application software is possible while maintaining security. That is to say, since divided information items simply lose their personal information, and a data structure such as a data matrix is an array that is comprehensible to a user at a glance, a user has the feeling of continuing normal data processing work in the same way, and an improvement in work efficiency can be expected. In a mode in which data is encrypted, data that is handled is encrypted data, and it is therefore difficult to achieve the same workability. Furthermore, in a mode in which data is encrypted, personal information data becomes vulnerable once data encryption is cracked, but in this embodiment, divided fragmentary information itself loses its meaning as personal information, and therefore an extremely robust data protection function is provided from the standpoint of personal information protection.

Moreover, linkage key information that links fragments of information is stored separately from the fragments. Since protection of personal information depends on linkage key information file management, rigorous unified centralized management of personal information can be effectively achieved. Furthermore, destruction even of an enormous quantity of information is achieved by destroying a linkage key information file.

Here, attribute information, which accounts for the major part of information, ceases to be personal information through being separated from identification information. It is therefore possible to store such data on a hard disk or the like and carry it around. The advantage of not incurring a risk of leakage of information when it is carried around eliminates the inconvenience of a thin client according to conventional technology.

Differences from encrypted information will now be further described. The structure of this data storage method does not provide a clue to decryption. Mechanically encrypted information always contains a salient meaningful combination among countless combinations. Taking this salient meaningful combination as a clue, encrypted information will always be decrypted logically. In contrast, in this embodiment identification information is divided into family name and given name fragments, and the family name and given name are stored after random rearrangement using a random number table. For a name formed by again combining family name and given name fragments, all combinations have the same degree of meaning. All combinations can be said to be equivalent in terms of degree of meaningfulness. Similarly, combinations of attribute information and identification information can also be said to be equivalent in terms of degree of meaningfulness. Therefore, excellent personal information protection can be achieved due to the fact that no clue to restoring information is held therein.

EMBODIMENT 2

In Embodiment 1, personal information undergoes first division into identification information and attribute information, identification information that has undergone first division further undergoes second division into a plurality of fragments for which data processing is possible, and linkage key information is generated for restoring the divided identification information, attribute information, and plurality of fragments to the original personal information. Embodiment 2 is another example of division of data including personal information.

The hardware configuration is the same as in FIG. 2, and therefore a description thereof is omitted here.

Figure 8A:
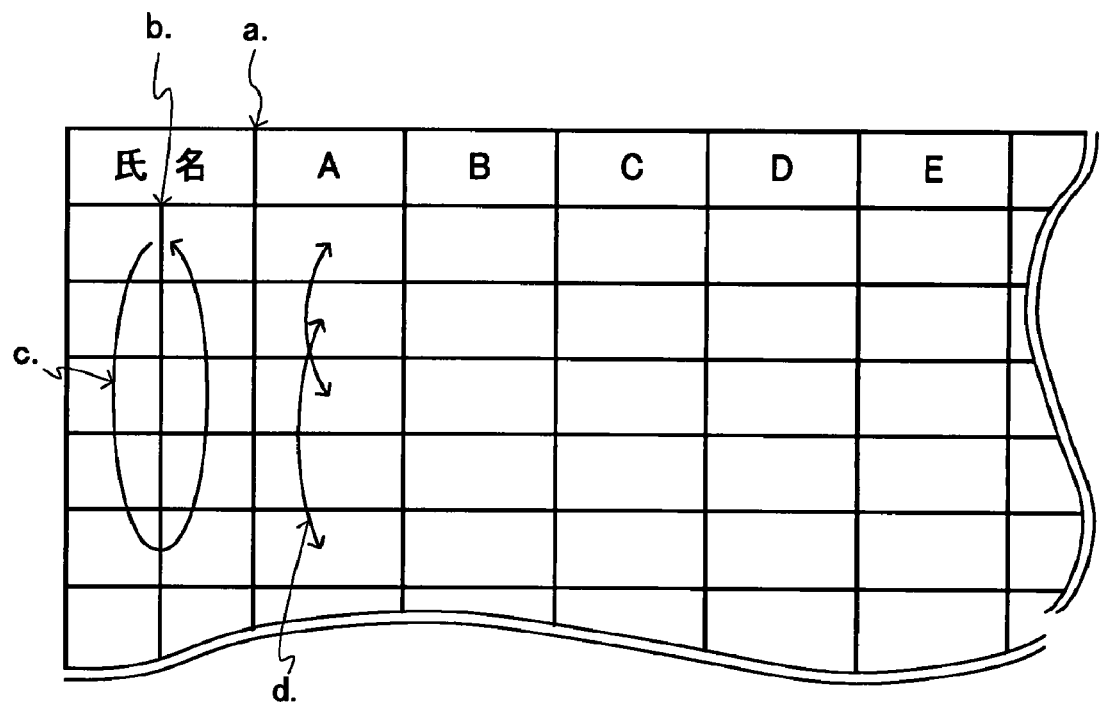
FIG. 8 is a drawing explaining a different mode of division processing of data including personal information of a data management apparatus according to Embodiment 2 of the present invention.

FIG. 8 is a drawing explaining a different mode of division processing of data including personal information of a data management apparatus according to Embodiment 2 of the present invention. In Embodiment 1, as shown in FIG. 8A, personal information undergoes first division into identification information (name) and attribute information (A, B, . . . ) (see reference code a.), and identification information (name) that has undergone first division undergoes second division into a plurality of family name and given name fragments for which data processing is possible (see reference code b.). Then divided family names and given names are randomly rearranged (see reference code c.), thereby also randomly rearranging the attribute information data columns (see reference number d.).

Figure 8B:
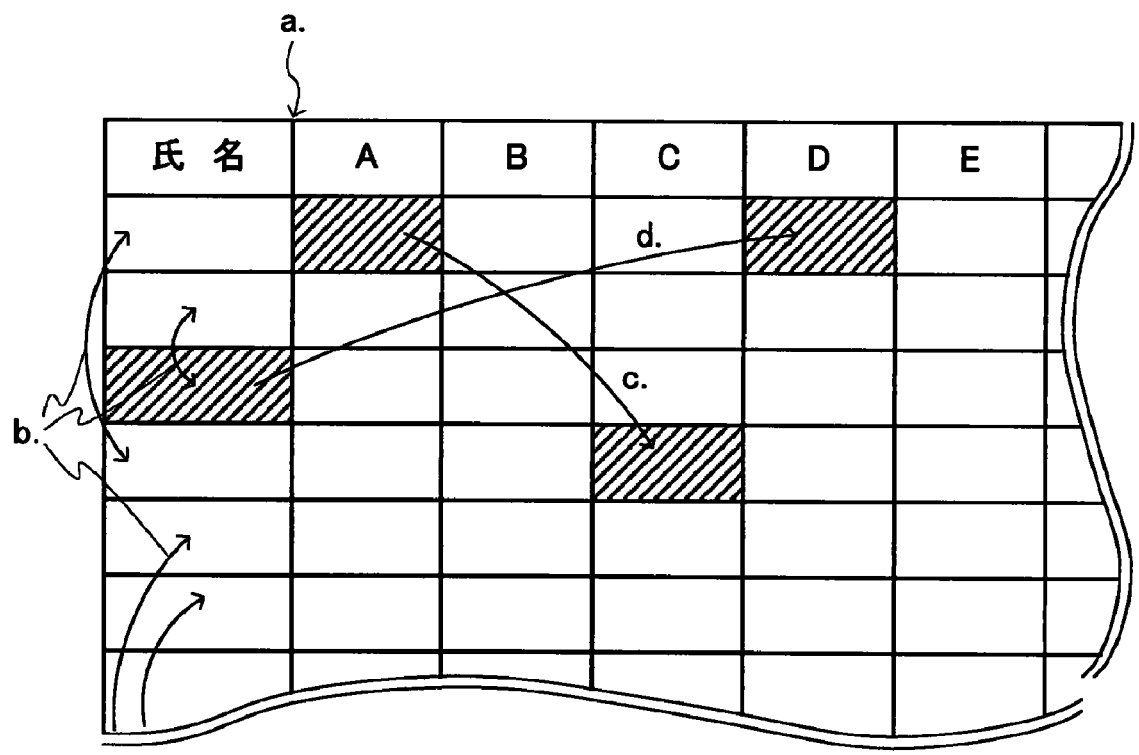

However, the division of data including personal information is not limited to the above-described example. For example, first division and second division may be performed simultaneously, and it is also possible to divide data including personal information into an arbitrary plurality of fragmentary information items. This is illustrated in FIG. 8B. As shown in FIG. 8B, data including personal information is divided at arbitrary places. Here, personal information is divided into identification information (name), and attribute information (A) and attribute information (B, . . . ). The division of data including personal information may be ended here, or division may be further repeated. Then divided identification information (name), attribute information (A), and attribute information (B, . . . ), are randomly rearranged (see reference code b.). By this means, the relevant data column of attribute information (A) indicated by hatching in FIG. 8B comes to correspond to the relevant data column of attribute information (C), and the relevant "name" data column indicated by hatching in FIG. 8B comes to correspond to the relevant data column of attribute information (D). Therefore, in this embodiment also, data including personal information can be re-divided into a plurality of fragments whose identification function has been almost totally eliminated, and it is possible to configure a database or perform data processing by means of spreadsheet or suchlike application software while maintaining security.

That is to say, random rearrangement is possible without passing through the above-described stage by not performing random rearrangement (see reference codes c. and d.) by performing second division (see reference code b.) after first division (see reference code a.) as shown in FIG. 8A, but by generating an address table with address correspondences before and after conversion as shown in FIG. 8B.

A data management apparatus according to the above-described embodiments may be a stand-alone apparatus or may be an apparatus incorporated into a personal computer or similar information processing apparatus or a server.

The data processing in FIG. 4, FIG. 6, FIG. 7 and FIG. 8 is just one example, and any data and divided storage method may be used. It is also possible for data rearrangement to be employed adaptively.

In these embodiments, the terms "data management apparatus," "data management method," and "data processing method" have been used, but this is simply for the sake of convenience in explaining the embodiments, and terms such as "information processing apparatus" and "personal information management method" may of course also be used.

The type, number, connection method, and so forth of circuit sections, such as storage apparatuses, composing an above-described data management apparatus, are not limited to the above embodiments.

An above-described data management apparatus, data management method, and data processing method are also implemented by a program for causing this data management apparatus, data management method, and data processing method to function. This program is stored on a computer-readable recording medium. As this recording medium in the present invention, main memory itself may be the program medium, or a program medium may be used that is readable by inserting a recording medium in a program reading apparatus provided as an external storage apparatus. In either case, a configuration may be used whereby a stored program is read and accessed by a CPU, or in either case a method may be used whereby a program is read, the read program is downloaded to a program storage area (not shown), and that program is executed. This program for downloading is assumed to be stored in the main apparatus beforehand.

Here, the above-mentioned program medium is a storage medium configured so as to be separable from the main unit, and may be a medium that holds a program fixedly, including a type of tape, such as a magnetic tape or cassette tape; a type of disk, such as a floppy (registered trademark) disk, hard disk, or suchlike magnet disk, or a CD-ROM/MO/MD/DVD or suchlike optical disk; a type of card, such as an IC card or optical card; or semiconductor memory such as mask ROM, EPROM, EEPROM, or flash ROM.

Furthermore, although not illustrated in the drawings, when a section for which connection to an external communication network is possible is provided, the program medium may be a medium that holds a program fluidly so that a program is downloaded from a communication network via that communication connection section. When a program is downloaded from a communication network in this way, that program for downloading may be stored in the main apparatus beforehand, or may be installed from another recording medium. Contents stored on a recording medium are not limited to a program, but may also be data.

The present application is based on Japanese Patent Application No. 2005-213302 filed on Jul. 22, 2005, and Japanese Patent Application No. 2006-156632 filed on Jun. 5, 2006, entire content of which is expressly incorporated herein by reference.

INDUSTRIAL APPLICABILITY

A data management apparatus, data management method, and data processing method according to the present invention are useful for a database distributed storage and management method for the purpose of personal information protection. Also, as a program, the present invention is suitable for application to package software such as spreadsheet software or the like. Furthermore, since the present invention does not require special members and does not entail an increase in the number of components, it is low-cost and easy to implement, and can be widely applied to information processing apparatuses such as personal computers.

The invention claimed is:

1. A personal information data processing method that causes a computer to execute processing of personal information data including identification information that enables identification of a specific individual, the method comprising:
   a identification information database function providing storage of identification information in which identification information that enables identification of a specific individual, the identification information database function comprising:
      a step of displaying in a specifiable fashion a division range comprising a boundary that eliminates an identification function of the identification information when stored, in a manner which renders the identification information meaningless;
      a step of receiving a division location specification from a user when displaying the division range;
      a step of dividing the identification information into at least a first fragment and a second fragment in accordance with the division location specified by the user, wherein each fragment by itself does not enable identification of a specific individual;
      a step of generating a first linkage key information comprising an association between the first fragment and the second fragment; and
      a step of storing the first linkage key information, the first fragment and the second fragment in a storage section; and
   an attribute information database function providing storage of attribute information that does not by itself enable identification of a specific individual, the attribute information database function comprising:
      a step of storing the attribute information and stored as a separate database from the identification information as segmented information; and
      a step of linking the attribute information to the identification information associated with the identification information database by a second linkage key information.

2. A personal information data processing method according to claim 1, wherein, the displaying step searches a database of names and displays a division location between the family name and the given name by default.

3. A personal information data processing method according to claim 1, wherein, the storing step stores the linkage key information, the first fragment and the second fragment in different areas in a storage medium.

4. A personal information data processing method according to claim 1 further comprising:
   a data restoration function permitting restoring original identification information from the divided plurality of fragmentary information items and the attribute information based on the association of the stored first and second linkage key information.

5. A personal information data processing method according to claim 1, wherein, the displaying step displays one or more of a space between a family name and a given name, a hyphen, or a number of characters as the division range.

6. A program that causes a computer to execute processing of personal information data including identification information that enables identification of a specific individual, wherein the program causes the computer to execute:
   a step of displaying in a specifiable fashion a division range comprising a boundary that eliminates an identification function of the identification information when stored, in a manner which renders the identification information meaningless;
   a step of receiving a division location specification from a user when displaying the division range;

a step of dividing the identification information into at least a first fragment and a second fragment in accordance with the division location specified by the user, wherein each fragment by itself does not enable identification of a specific individual;

a step of generating a first linkage key information comprising an association between the first fragment and the second fragment;

a step of storing the first linkage key information, the first fragment and the second fragment in a storage section; and a step of storing attribute information that, does not by itself enable identification of a specific individual, and stored as a separate database from the identification information as segmented information;

a step of linking the attribute information to the identification information associated with the identification information database by a second linkage key information.

7. A computer-readable recording medium that causes a computer to execute processing personal information data including identification information that enables identification of a specific individual, wherein the recording medium records a program for causing the computer to execute:

a identification information database function providing storage of identification information in which identification information that enables identification of a specific individual, the identification information database function comprising:

a step of displaying in a specifiable fashion a division range comprising a boundary that eliminates an identification function of the identification information when stored, in a manner which renders the identification information meaningless;

a step of receiving a division location specification from a user when the division range is displayed;

a step of dividing the identification information into at least a first fragment and a second fragment in accordance with the division location specified by the user, wherein each fragment by itself does not enable identification of a specific individual;

a step of generating a first linkage key information comprising an association between the first fragment and the second fragment; and a step of storing the first linkage key information, the first fragment and the second fragment in a storage section; and an attribute information database function providing storage of attribute information that, does not by itself enable identification of a specific individual, the attribute information database function comprising:

a step of storing the attribute information and stored as a separate database from the identification information as segmented information; and a step of linking the attribute information to the identification information associated with the identification information database by a second linkage key information.

\* \* \* \* \*

UNITED STATES PATENT AND TRADEMARK OFFICE
CERTIFICATE OF CORRECTION

| | | |
|---|---|---|
| PATENT NO. | : 7,962,492 B2 | Page 1 of 1 |
| APPLICATION NO. | : 11/667388 | |
| DATED | : June 14, 2011 | |
| INVENTOR(S) | : Yukio Fujimoto | |

It is certified that error appears in the above-identified patent and that said Letters Patent is hereby corrected as shown below:

Title Page, Item (54) and at Column 1, lines 1-3,
please change the title:

delete
"DATA MANAGEMENT APPARATUS, DATA MANAGEMENT METHOD, DATA PROCESSING METHOD, AND PROGRAM"
and replace with
-- DATA MANAGEMENT DEVICE, DATA MANAGEMENT METHOD, DATA PROCESSING METHOD, AND PROGRAM --

Signed and Sealed this
Twelfth Day of July, 2011

David J. Kappos
*Director of the United States Patent and Trademark Office*